United States Patent
Yang et al.

(10) Patent No.: US 10,222,208 B2
(45) Date of Patent: Mar. 5, 2019

(54) APPARATUS, SYSTEM AND METHOD OF ESTIMATING AN ORIENTATION OF A MOBILE DEVICE

(71) Applicant: Intel Corporation, Santa Clara, CA (US)

(72) Inventors: Xue Yang, Arcadia, CA (US); Lei Yang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 726 days.

(21) Appl. No.: 14/141,456

(22) Filed: Dec. 27, 2013

(65) Prior Publication Data

US 2015/0185002 A1    Jul. 2, 2015

(51) Int. Cl.
G01B 21/22 (2006.01)
G01C 19/00 (2013.01)
G01C 22/00 (2006.01)

(52) U.S. Cl.
CPC ............ G01B 21/22 (2013.01); G01C 19/00 (2013.01); G01C 22/006 (2013.01)

(58) Field of Classification Search
CPC ....... G01C 22/006; G01C 19/00; G01B 21/22
See application file for complete search history.

(56) References Cited

U.S. PATENT DOCUMENTS

| | | | | |
|---|---|---|---|---|
| 5,107,205 A * | 4/1992 | Ebihara | ............ | G01R 31/31912 324/73.1 |
| 5,168,277 A * | 12/1992 | LaPinta | .................... | H01Q 1/18 342/62 |
| 7,587,277 B1 * | 9/2009 | Wells | ................... | G01C 21/165 701/510 |
| 8,120,498 B2 * | 2/2012 | Dishongh | ............ | A61B 5/1113 340/573.1 |
| 9,778,040 B1 * | 10/2017 | Iascone | ............. | G01C 19/5776 |
| 2008/0077326 A1 * | 3/2008 | Funk | .................... | G01C 21/165 701/500 |
| 2008/0186161 A1 | 8/2008 | Fussner et al. | | |

(Continued)

FOREIGN PATENT DOCUMENTS

CN        101627610 A       1/2010
GB        2468958           9/2010

(Continued)

OTHER PUBLICATIONS

Saint, et al., "Integrated Circuit", Enciclopedia Britanica, 2015, https://www.britannica.com/technology/integrated-circuit.*

(Continued)

*Primary Examiner* — Alexander Satanovsky
*Assistant Examiner* — Lina M Cordero
(74) *Attorney, Agent, or Firm* — Shichrur & Co.

(57) ABSTRACT

Some demonstrative embodiments include apparatuses, systems and/or methods of estimating an orientation of a mobile device. For example, an apparatus may include an orientation estimator to receive an indication of first and second consecutive steps of a user carrying a mobile device, to determine an angular rotation of an orientation parameter between the first and second steps, and to determine a value of the orientation parameter based on a comparison between the angular rotation and at least one predefined angular rotation threshold.

21 Claims, 6 Drawing Sheets

(56) References Cited

U.S. PATENT DOCUMENTS

| | | | | |
|---|---|---|---|---|
| 2010/0132047 | A1* | 5/2010 | Rodriguez | G06F 12/1416 726/27 |
| 2010/0256939 | A1* | 10/2010 | Borenstein | G01C 21/06 702/96 |
| 2011/0241656 | A1* | 10/2011 | Piemonte | G01C 17/38 324/207.11 |
| 2012/0130632 | A1 | 5/2012 | Bandyopadhyay et al. | |
| 2012/0136573 | A1* | 5/2012 | Janardhanan | G01C 21/165 701/512 |
| 2012/0259572 | A1* | 10/2012 | Afzal | G01C 21/165 702/92 |
| 2013/0090881 | A1* | 4/2013 | Janardhanan | G01C 22/006 702/104 |
| 2013/0166198 | A1 | 6/2013 | Funk et al. | |
| 2013/0166202 | A1 | 6/2013 | Bandyopadhyay et al. | |
| 2013/0245982 | A1* | 9/2013 | Buchanan | G01C 19/00 702/93 |
| 2014/0019082 | A1* | 1/2014 | Lan | G01C 21/206 702/141 |
| 2014/0058704 | A1* | 2/2014 | Buchanan | G06F 17/00 702/180 |
| 2014/0156215 | A1* | 6/2014 | Eastman | A61B 5/112 702/141 |
| 2014/0161358 | A1* | 6/2014 | O'Haire | G06K 9/3216 382/199 |
| 2014/0172361 | A1* | 6/2014 | Chiang | G01C 22/006 702/160 |
| 2014/0194138 | A1* | 7/2014 | Amizur | G01C 21/165 455/456.1 |
| 2014/0222369 | A1* | 8/2014 | Flament | G01C 17/38 702/150 |
| 2014/0278183 | A1* | 9/2014 | Zheng | G01P 21/00 702/96 |
| 2014/0372026 | A1* | 12/2014 | Georgy | G01S 19/47 701/469 |

FOREIGN PATENT DOCUMENTS

| | | |
|---|---|---|
| KR | 20020001257 | 1/2002 |
| KR | 20110068340 | 6/2011 |
| KR | 101394984 B1 | 5/2014 |

OTHER PUBLICATIONS

International Search Report and Written Opinion for International Application No. PCT/US2014067796, dated Mar. 13, 2015, 11 pages.
International Preliminary Report on Patentability for PCT/US2014/067796, dated Jul. 7, 2016, 10 pages.
Office Action for Chinese Patent Application Serial No. 201480064947.7, dated Apr. 5, 2017, 9 pages.
European Search Report for European Patent Application No. 14873566.5, dated Aug. 14, 2017, 9 pages.
Office Action for European Patent Application No. 14873566.5, dated May 7, 2018, 5 pages.

* cited by examiner

APPARATUS, SYSTEM AND METHOD OF ESTIMATING AN ORIENTATION OF A MOBILE DEVICE

TECHNICAL FIELD

Embodiments described herein generally relate to estimating an orientation of a mobile device.

BACKGROUND

A mobile device may determine a location of the mobile device using various methods. For example, the mobile device may include a Global Positioning System (GPS) receiver to receive GPS signals from one or more GPS satellites, and to calculate the location of the mobile device based on the GPS signals.

In various occasions, the mobile device may not be able to receive the GPS signals, for example, when the GPS signals are weak, e.g., when the device is located at an indoor location, e.g., a building and the like. As a result, the mobile device may not be able to determine the location of the mobile device.

Some mobile devices may utilize an inertial navigation system to determine the location of the device, e.g., when the device is not able to receive the GPS signals, or to accurately determine the location of the device based on the GPS signals.

The inertial navigation system may include one or more inertial navigation sensors configured to provide position, velocity and/or acceleration parameters. For example, a shown in FIG. 6, an inertial navigation system 600 may include one or more movement sensors, e.g., an accelerometer sensor 602 and the like, to detect a movement of the mobile device and to provide movement parameters corresponding to the movement of the mobile device, e.g., velocity and/or acceleration; and/or one or more orientation sensors, e.g., a gyroscope sensor 604, a magnetometer 606, and the like, to provide orientation parameters relating to the orientation of the mobile device. Inertial navigation system 600 may include a coordinate frame transformation 610 to transform a sensor body coordinate frame 612 into navigation coordinate frame 614.

The mobile device may determine the location of the device based on the parameters provided by the inertial navigation sensors. For example, the device may calculate a distance and a direction from a previous known location of the device based on the movement parameters and/or the orientation parameters.

The gyroscope 604 may have errors, e.g., mechanical errors, calibration errors, and the like, which may affect the accuracy of one or more of the orientation parameters. The gyroscope errors may decrease an accuracy of the determined location of the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
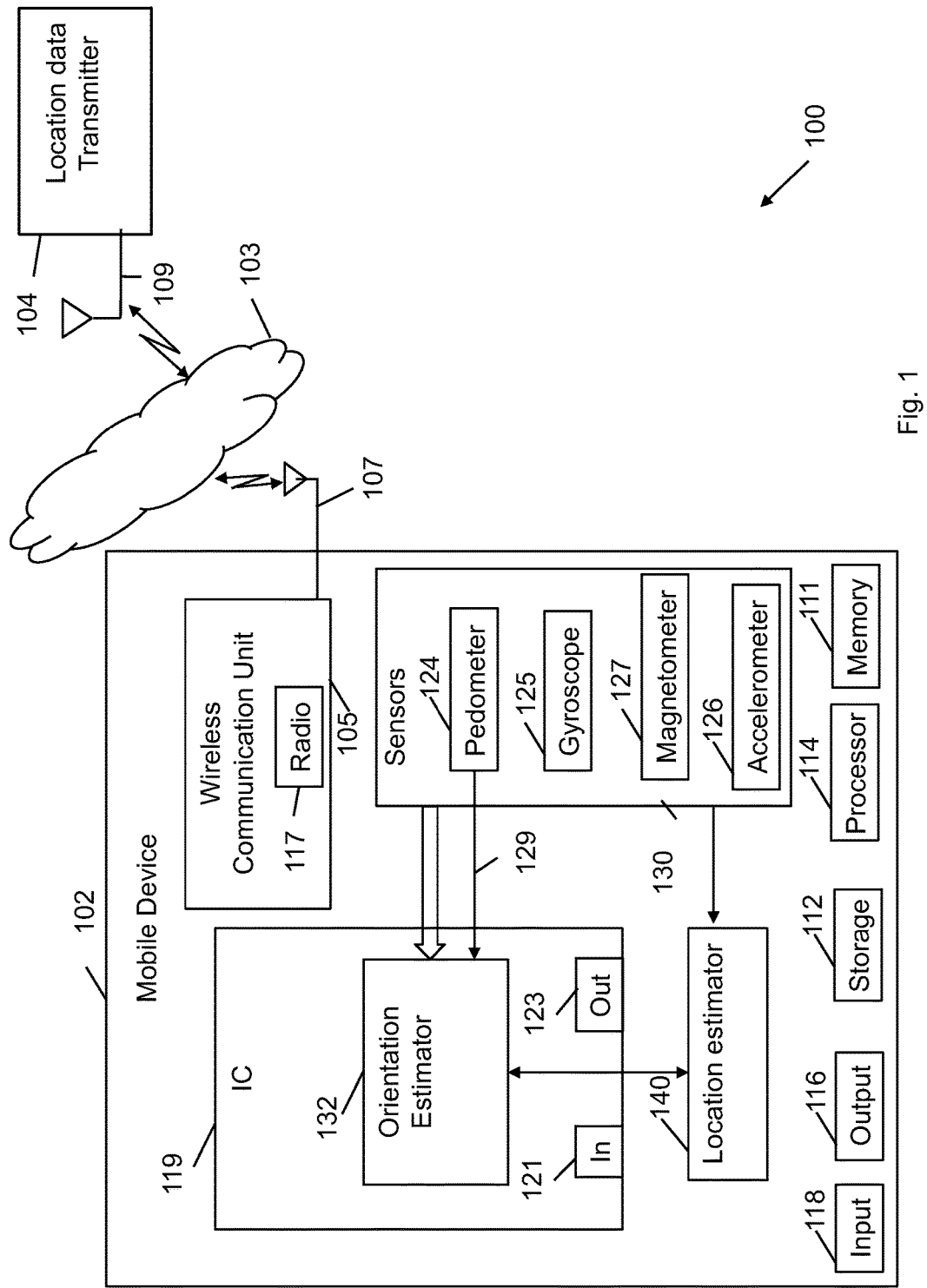
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof" devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0) and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Reference is made to FIG. 1, which schematically illustrates a block diagram of a system 100, in accordance with some demonstrative embodiments.

As shown in FIG. 1, in some demonstrative embodiments, system 100 may include one or more mobile devices, e.g., a mobile device 102.

In some demonstrative embodiments, mobile device 102 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 102 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, device 102 may include a wireless communication unit 105 to perform wireless communication between device 102 and one or more other wireless communication devices over WM 103.

In some demonstrative embodiments, wireless communication unit 105 may include a radio 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication unit 105 may include or may be implemented as part of a wireless Network Interface Card (NIC), and the like.

In some demonstrative embodiments, wireless communication unit 105 may include, or may be associated with, one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, mobile device 102 may also include, for example, a processor 114, an input unit 118, an output unit 116, a memory unit 111, and/or a storage unit 112. Mobile device 102 may optionally include other suitable hardware components and/or software components. In some demonstrative embodiments, some or all of the components of mobile device 102 may be enclosed in a common housing or packaging, and may be interconnected or operably associated using one or more wired or wireless links. In other embodiments, components of mobile device 102 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 114 executes instructions, for example, of an Operating System (OS) of mobile device 102 and/or of one or more suitable applications.

Memory unit 111 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 include, for example, a hard disk drive, a floppy disk drive, a Compact Disk (CD) drive, a CD-ROM drive, a DVD drive, or other suitable removable or non-removable storage units. For example, memory unit 111 and/or storage unit 112, for example, may store data processed by mobile device 102.

Input unit 118 includes, for example, a keyboard, a keypad, a mouse, a touch-screen, a touch-pad, a track-ball, a stylus, a microphone, or other suitable pointing device or input device. Output unit 116 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, device 102 may be capable of receiving wireless communication signals including raw location data, e.g., over wireless medium 103. For example, device 102 may receive GPS signals including the raw location data from one or more location data transmitters 104, e.g., one or more GPS satellites.

In some demonstrative embodiments, location data transmitters 104 may be configured to transmit wireless communication signals including the raw location data via one or more antennas 109. For example, location data transmitters 104 may include one or more location data origin transmitters, e.g., GNSS satellites to generate GNSS-based raw location data.

In some demonstrative embodiments, device 102 may include a location estimator 140 configured to estimate a location of device 102 based on the raw location data.

In some demonstrative embodiments, device 102 may include one or more sensors 130 configured to provide one or more location parameters relating to the location of device 102. Location estimator 140 may utilize the location parameters to estimate the location of device 102, e.g., in addition to or instead of the raw location data.

In one example, location estimator 140 may utilize the location parameters when the raw location data may not be accurate, e.g., when the received GPS signals are weak.

In another example, location estimator 140 may utilize the location parameters when device 102 may not be able to receive the GPS signals. For example, device 102 may be located at an indoor location, e.g., a building, a mall and the like, which may not enable device 102 to receive the GPS signals, e.g., the GPS signals may be blocked by, for example, walls, ceilings and the like. Accordingly, location estimator 140 may not be able to estimate the location of device 102 in an accurate manner.

In another example, device 102 may not be configured to receive the raw location date, e.g., device 102 may not be able to communicate with location data transmitter 104, and location estimator 140 may be configured to estimate the location of device 102 based on the location parameters from sensors 130.

In some demonstrative embodiments, sensors 130 may include a gyroscope sensor 125, a magnetometer 127, and/or an accelerometer sensor 126 configured to provide the location parameters.

In some demonstrative embodiments, accelerometer 126 may provide to location estimator 140 acceleration information including movement parameters relating to a movement of device 102.

In one example, the movement parameters may include horizontal acceleration parameters of device 102.

In some demonstrative embodiments, location estimator 140 may utilize the horizontal acceleration parameters to determine, for example, a speed of device 102 and/or a movement distance of device 102.

In another example, the movement parameters may include vertical acceleration parameters of device 102.

In some demonstrative embodiments, location estimator 140 may utilize the vertical acceleration parameters, for example, to determine a pitch and/or a roll ("the tilt") of device 102, for example, when tilting device 102.

In some demonstrative embodiments, magnetometer 127 may provide to location estimator 140 magnetic information relating to a strength and/or a direction of magnetic fields.

In some demonstrative embodiments, location estimator 140 may utilize the magnetic information, for example, to determine the direction of the magnetic north. Location estimator 140 may utilize the direction of the magnetic north, for example, to determine a yaw of device 102, e.g., with respect to the magnetic north.

In some demonstrative embodiments, gyroscope 125 may provide to location estimator 140 gyroscope information including gyroscope orientation parameters relating to an orientation of device 102. For example, the gyroscope orientation parameters may include a yaw parameter relating to the yaw of device 102, a pitch parameter relating to the pitch of device 102 and/or a roll parameter relating to the roll of device 102.

In some demonstrative embodiments, location estimator 140 may utilize the gyroscope orientation parameters, for example, to determine the orientation of device 102.

In some demonstrative embodiments, location estimator 140 may determine an orientation of device 102 based on the gyroscope information, the magnetic information, and/or the acceleration information. For example, device 102 may determine the orientation of device 102 based on a combination of the gyroscope orientation parameters, the magnetic information relating to the yaw of device 102, and/or the tilt angle from the acceleration parameters, e.g., as described above.

In some demonstrative embodiments, location estimator 140 may determine a movement of device 102 based on the horizontal acceleration parameters of device 102.

Figure 2:
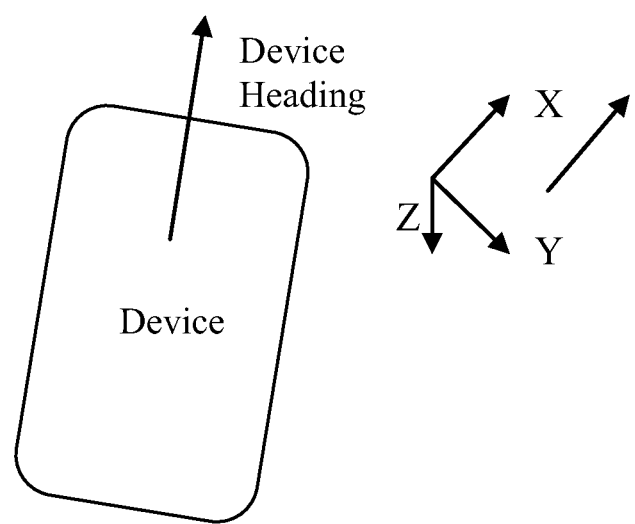
FIG. 2 is a schematic illustration of a navigation coordinate system, in accordance with some demonstrative embodiments.

In some demonstrative embodiments, location estimator 140 may utilize a North, East, Down (NED) navigation coordinate system. For example, the navigation coordinate system may include an x-axis, which may point to the north, a y-axis, which may point to the right, and a z-axis, which may point downwards, e.g., as shown in FIG. 2. In other embodiments, location estimator 140 may utilize any other navigation system.

In some demonstrative embodiments, location estimator 140 may define a positive yaw angle, denoted $\theta_{yaw}$, to be a counter-clockwise rotation about the positive z-axis, a positive pitch angle, denoted $\theta_{pitch}$, to be a counter-clockwise rotation about the positive y-axis, and a positive roll angle, denoted $\theta_{roll}$, to be a counter-clockwise rotation about the positive x-axis.

In some demonstrative embodiments, location estimator 140 may determine an estimated location of device 102 with respect to the NED navigation coordinate system.

In some demonstrative embodiments, sensors 130 may provide the location parameters with respect to a body coordinate frame of device 102.

In some demonstrative embodiments, location estimator 140 may transform the location parameters from the body coordinate frame of device 102 into the NED navigation coordinate system, for example, by utilizing a rotation matrix (RMAT). In other embodiments, sensors 130 and/or location estimator 140 may utilize any other coordinate systems, and/or location estimator 140 may transform the location parameters from the body coordinate frame of device 102 into the NED navigation coordinate system, for example, by utilizing any other method and/or algorithm.

In some demonstrative embodiments, location estimator 140 may determine an estimated location of device 102 based on the orientation of device 102 and the movement of device 102. For example, device 102 may calculate a distance and a direction from a previous known location of device 102, e.g., provided by the GPS signals or provided by a previous calculation of the estimated location of device 102, based on the movement and/or the orientation of device 102.

In some demonstrative embodiments, location estimator 140 may determine the estimated location of device 102 at a relatively low accuracy level, for example, if the estimated orientation of device 102 is not accurate.

In some demonstrative embodiments, location estimator 140 may estimate the orientation of device 102 at a relatively low accuracy level, for example, if location estimator 140 estimates the orientation of device 102 based on the magnetic information from magnetometer 127 and/or the acceleration information from accelerometer 126, e.g., if the magnetic information from magnetometer 127 and/or the acceleration information from accelerometer 126 have a low accuracy level.

In one example, magnetometer 127 may provide the magnetic information at a relatively low accuracy level, for example, if electrical devices and/or ferromagnetic elements in the indoor environment cause deviations in the magnetic fields. As a result, location estimator 140 may not be able to determine the yaw of device 102 at a relatively high level of accuracy based on the magnetic information.

In another example, accelerometer 126 may provide the vertical acceleration parameters at a relatively low accuracy level, for example, if the vertical acceleration parameters are affected and/or not differentiated from gravity. As a result, location estimator 140 may not be able to determine the pitch and/or the roll of device 102 at a relatively high level of accuracy based on the vertical acceleration parameters.

In some demonstrative embodiments, location estimator 140 may estimate the orientation of device 102 based on the gyroscope orientation information from gyroscope 125. For example, estimating the orientation of device 102 based on the information from gyroscope 125 may produce a relatively better accuracy, e.g., compared to estimating the orientation of device 102 based on the information from accelerometer 126 and/or magnetometer 127.

In some demonstrative embodiments, gyroscope 125 may provide the gyroscope orientation parameters at a relatively low accuracy level, for example, due to mechanical errors, calibration errors and/or measurements errors.

In some demonstrative embodiments, gyroscope 125 may include, for example, a relatively low cost gyroscope. For example, gyroscope 125 may include a low cost microelectrical-mechanical systems (MEMS) gyroscope sensor. Low cost MEMS often suffer from a gyroscope bias drift and large sensor measurement noise. Accordingly, a consumer low grade gyroscope MEMS sensor may drift tens of degrees per hour, which significantly limits an orientation accuracy of device 102.

In one example, the gyroscope orientation parameters may include orientation errors, for example, from the relatively large sensor measurement noise. The orientation error may add or subtract a random number of degrees from the gyroscope orientation parameters.

In another example, the gyroscope orientation parameters may include the orientation errors, for example, from the gyroscope bias drift. The orientation errors may cause, for example, a drift of tens of degrees per hour at the gyroscope orientation parameters.

In some demonstrative embodiments, the orientation errors may affect the gyroscope orientation parameters and may increase and/or accumulate over time.

Some demonstrative embodiments may enable correcting the orientation errors of gyroscope 125, e.g., caused by the gyroscope bias drift and/or the sensor measurement noise.

Some demonstrative embodiments may enable correcting the orientation errors, for example, even without using any external reference, e.g., without using a Kalman filter.

In some demonstrative embodiment, device 102 may include an orientation estimator 132 configured to estimate an orientation of device 102, for example, even without using any external reference, e.g., as described in detail below.

In some demonstrative embodiments, orientation estimator 132 may be implemented by an integrated circuit (IC) 119. For example, IC 119 may have an input 121 to receive one or more inputs from one or more elements of device 102, and an output 123 to provide one or more outputs from IC 119 to one or more elements of device 102, e.g., as described below. In other embodiments, orientation estimator 132 may be implemented as any other element of device 102, e.g., using hardware, software, firmware, and/or the like.

In some demonstrative embodiments, orientation estimator 132 may correct the orientation errors of gyroscope 125.

In some demonstrative embodiments, orientation estimator 132 may determine the orientation parameters of device 102 based on steps of a user carrying mobile device 102.

In some demonstrative embodiments, orientation estimator 132 may correct the yaw of device 102 based on the steps of the user carrying mobile device 102.

In some demonstrative embodiments, a heading of device 102 may be aligned with a heading direction of the user of device 102. Accordingly, changes in the heading direction of the user may be reflected by a yaw angular rotation of device 102.

In some demonstrative embodiments, a rate of change of the yaw angular rotation of device 102 with respect to a number of steps of the user of device 102 may be correlated to a turn of the user of device 102. In one example, a relatively high rate of change of the yaw angular rotation within a relatively small number of steps may indicate that the user of device 102 is making a turn. In one example, the user of device 102 may complete a turn within two steps and, accordingly, a relatively large change of the yaw angle of device 102 within two steps may indicate the user of device 102 is making a turn.

In some demonstrative embodiments, orientation estimator 132 may classify the yaw angular rotation of device 102 as an angular rotation caused by the turn of the user of device 102 ("an intentional yaw change"); or as an angular rotation, which is not caused by a turn of the user of device 102 ("an unintentional yaw change"). For example, the unintentional yaw change may result from small changes in a posture and/or in stride phases of the user of device 102, from the gyroscope bias drift and/or from the measurement noise of gyroscope 125

In some demonstrative embodiments, orientation estimator 132 may classify the yaw angular rotation of device 102 as an intentional yaw change or an unintentional yaw change, for example, based on the rate of change of the yaw angular rotation of device 102 with respect to the number of steps.

In one example, orientation estimator 132 may classify the yaw angular rotation of device 102 as an intentional yaw change, for example, if the yaw angular rotation of device 102 includes a relatively large change in the yaw angular rotation of device 102, e.g., greater than 10 degrees, per step. Such intentional yaw change may result, for example, from a relatively large change in the heading direction of the user, e.g., a turn of the user along a walking path.

In another example, orientation estimator 132 may classify the yaw angular rotation of device 102 as an unintentional yaw change, for example, if the yaw angular rotation of device 102 includes a relatively small yaw change in the yaw angular rotation, e.g., less than 10 degrees, per step. Such unintentional yaw change may result, for example, from small changes in the posture and/or in stride phases of the user of device 102, from the gyroscope bias drift, and/or from the measurement noise of gyroscope 125. Accordingly, the relatively small yaw change in the yaw angular rotation may not be correlated with the heading direction of the user of device 102.

In one example, orientation estimator 132 may classify the yaw angular rotation of device 102 as an unintentional yaw change of device 102, if the user walks along a substantially straight path without making any turns.

In some demonstrative embodiments, orientation estimator 132 may correct the pitch and the roll, e.g., the tilt, of device 102 based on rate of change of the tilt angular rotation of device 102 with respect to the steps of the user carrying mobile device 102, e.g., as described below.

In some demonstrative embodiments, a tilting of device 102 by the user may be reflected by a tilt angular rotation, e.g., a pitch angular rotation and/or a roll angular rotation, of device 102.

In some demonstrative embodiments, orientation estimator 132 may classify the tilt angular rotation of device 102 as an angular rotation caused by an intentional tilt of device 102 ("an intentional tilt change"); or as an angular rotation, which is caused by intentional tilt of device 102 by the user of device ("an unintentional tilt change"). For example, the unintentional tilt change may result, for example, from relatively small changes in the posture and/or in stride phases of the user of device 102, from the gyroscope bias drift, and/or from the measurement noise of gyroscope 125.

In one example, orientation estimator 132 may classify the tilt angular rotation of device 102 as an intentional tilt change, for example, if the tilt angular rotation of device 102 includes a relatively large change in the tilt angular rotation of device 102, e.g., greater than 10 degrees, per step. Such intentional tilt change may result, for example, from an intentional tilt of device 102 by the user of device 102.

In another example, orientation estimator 132 may classify the tilt angular rotation of device 102 as an unintentional tilt change of device 102, for example, if the tilt angular rotation of device 102 includes a relatively small change in the tilt angular rotation, e.g., less than 10 degrees, per step. Such unintentional tilt change may result, for example, from the relatively small changes in the posture and/or in stride phases of the user of device 102, the gyroscope bias drift, and/or the measurement noise of gyroscope 125.

For example, the relatively small change may be correlated with the walking rhythm of the user of device 102 and/or a hand movement of a hand of the user carrying mobile device 102

In some demonstrative embodiments, device 102 may include a pedometer 124 configured to detect one or more steps of the user of device 102.

In some demonstrative embodiments, pedometer 124 may include a software module and/or a hardware module configured to detect steps of the user. For example, pedometer 124 may utilize the acceleration information provided by accelerometer 126, for example, to detect a positive vertical acceleration and/or a negative vertical acceleration associated with a rhythm of steps of the user of device 102, e.g., when walking along a walking path.

In some demonstrative embodiments, orientation estimator 132 may determine at least one orientation parameter of mobile device 102.

In some demonstrative embodiments, the at least one orientation parameter may include at least one orientation parameter of a yaw of mobile device 102, a pitch of mobile device 102 and/or a roll of mobile device 102.

In some demonstrative embodiments, orientation estimator 132 may receive an indication 129 of first and second consecutive steps of the user carrying mobile device 102.

For example, orientation estimator 132 may receive indication 129 from pedometer 124, e.g., upon detection of the first and second consecutive steps by pedometer 124.

In some demonstrative embodiments, orientation estimator 132 may determine an angular rotation of the orientation parameter between the first and second steps.

In some demonstrative embodiments, orientation estimator 132 may determine a yaw angular rotation of the yaw of device 102 between the first and second steps, a pitch angular rotation of the pitch of device 102 between the first and second steps and/or a roll angular rotation of the roll of device 102 between the first and second steps.

In some demonstrative embodiments, orientation estimator 132 may determine the angular rotation of the orientation parameter based on an integral of a sequence of values of the orientation parameter measured by gyroscope 125 between the first step and the second step. For example, orientation estimator 132 may determine the yaw angular rotation based on an integral of a sequence of yaw parameter measurements provided by gyroscope 125 between the first step and the second step.

In some demonstrative embodiments, orientation estimator 132 may determine the orientation parameter based on a comparison between the angular rotation and at least one predefined angular rotation threshold.

In some demonstrative embodiments, orientation estimator 132 may determine a yaw value representing the yaw of device 102 based on a comparison between the yaw angular rotation between the first and second steps, and a predefined yaw angular rotation threshold.

In some demonstrative embodiments, the yaw value may include an adjusted value configured to correct the gyroscope yaw error. For example, the yaw value may include a value to correct a yaw angular rotation of device 102, which may result from an unintentional yaw change.

In some demonstrative embodiments, orientation estimator 132 may update the yaw value, for example, if the yaw angular rotation is greater than the predefined yaw angular rotation threshold.

In some demonstrative embodiments, orientation estimator 132 may update the yaw value based on the yaw angular rotation and a yaw bias.

In some demonstrative embodiments, orientation estimator 132 may update the yaw bias based on the yaw angular rotation, for example, if the yaw angular rotation is less than the predefined yaw angular rotation threshold.

In some demonstrative embodiments, the yaw bias may be determined according to a moving average ("the yaw moving average") of yaw angular rotation values lesser than the predefined yaw angular rotation threshold.

In some demonstrative embodiments, the yaw moving average may include a moving average, within a time window ("yaw time window"), of one or more yaw angular rotation values, which are less than the predefined yaw angular rotation threshold. The yaw time window may include, for example, a time window having a predefined duration and ending at a time of the second step. For example, the user of device 102 may walk at a rate of one step per second, and the yaw time window may include 20 seconds. According to this example, the yaw moving average may include a moving average of the last 20 yaw angular rotations of the last 20 steps of the user of device 102.

In some demonstrative embodiments, orientation estimator 132 may utilize the yaw moving average, for example, to remove an impact of the unintentional yaw changes on the yaw angular rotation of device 102. For example, the unintentional yaw changes of the yaw may be canceled out, for example, if the unintentional yaw changes are random, e.g., as a result of the gyroscope measurement noise.

In some demonstrative embodiments, orientation estimator 132 may update the yaw value based on a difference between the yaw angular rotation and the yaw bias.

In some demonstrative embodiments, orientation estimator 132 may reset the yaw value, for example, if the yaw angular rotation is less than the predefined yaw angular rotation threshold, e.g., if the yaw angular rotation results from unintentional yaw change.

For example, pedometer 124 may detect first and second consecutive steps of a user carrying device 102. Orientation estimator 132 may receive indication 129 from pedometer 124 indicating the first and second steps.

In one example, orientation estimator 132 may determine a yaw angular rotation of 40 degrees between the first and second steps. Orientation estimator may update the yaw value to be 38 degrees, for example, if the predefined yaw angular rotation threshold is less than 38 degrees, e.g., 10 degrees, and the yaw bias is 2 degrees.

In another example, orientation estimator 132 may determine a yaw angular rotation of 6 degrees between the first and second steps. Orientation estimator may reset the yaw value, e.g., to be zero degrees, for example, if the predefined yaw angular rotation threshold is greater than 6 degrees, e.g., 10 degrees.

In some demonstrative embodiments, orientation estimator 132 may reset a pitch value representing the pitch and a roll value representing the roll, for example, if a pitch angular rotation of the pitch between the first and second steps is less than a predefined pitch rotation threshold, and a roll angular rotation of the roll between the first and second steps is less than a predefined roll rotation threshold.

In some demonstrative embodiments, the predefined roll rotation threshold and the predefined pitch rotation threshold may be both represented by a single predefined threshold, e.g., a predefined tilt threshold. In other embodiments, the predefined roll rotation threshold and the predefined pitch rotation threshold may be different.

In some demonstrative embodiments, the pitch value and/or the roll value may include adjusted values configured to correct the gyroscope related errors. For example, the roll value and/or the pitch value may correct the roll angular rotation and/or the pitch angular rotation, for example, if the roll angular rotation and the pitch angular rotation of device 102 result from an unintentional tilt change.

In some demonstrative embodiments, orientation estimator 132 may update a moving average ("pitch moving average") based on the pitch angular rotation, e.g., if the pitch angular rotation is less than the predefined pitch rotation threshold; and/or orientation estimator 132 may update a moving average ("roll moving average") based on the roll angular rotation, e.g., if the roll angular rotation is less than the predefined roll rotation threshold.

In some demonstrative embodiments, the pitch moving average may include a moving average, within a time window ("pitch time window"), of pitch angular rotation values, which are less than the predefined pitch angular rotation threshold. The pitch time window may include, for example, a time window having a predefined duration and ending at a time of the second step.

In some demonstrative embodiments, the roll moving average may include a moving average, within a time window ("roll time window"), of roll angular rotation values, which are less than the predefined roll angular rotation threshold. The roll time window may include, for example, a time window having a predefined duration and ending at a time of the second step.

In some demonstrative embodiments, the roll time window and the pitch time window may have the same duration. For example, orientation estimator 132 may update the pitch moving average and the roll moving average within a tilt time window. In other embodiments, the roll time window and the pitch time window may have different durations.

In some demonstrative embodiments, the tilt time window may include, for example, a time period longer than the yaw time window. For example, the tilt time window may include 20 seconds and the yaw time window may include 10 seconds. In other embodiments, the tilt time window and the yaw time window may include any other different or equal time periods.

In some demonstrative embodiments, a pitch bias may include the pitch moving average within the tilt time window and/or the roll bias may include the roll moving average within the tilt time window.

For example, pedometer 124 may detect first and second consecutive steps of the user carrying device 102. Orientation estimator 132 may receive indication 127 from pedometer 124 including the first and second steps.

In one example, orientation estimator 132 may determine a roll angular rotation of 5 degrees and a pitch angular rotation of 3 degrees between the first and second steps. Orientation estimator 132 may reset the pitch value and the yaw value, e.g., to be zero degrees, and may update the pitch bias with the pitch moving average and the roll bias with the roll moving average within the tilt time window, for example, if the predefined pitch angular rotation threshold and the yaw angular rotation are greater than 5 degrees, e.g., 10 degrees.

In some demonstrative embodiments, the tilt angular rotation threshold and/or the yaw angular rotation threshold may be adjusted, for example, based on human motion properties and/or trajectory constrains.

In one example, the yaw angular rotation threshold may be reduced, for example, if the user of device 102 walks in an environment, e.g., a relatively open outdoor space, in which non-straight line movement may happen more frequently, for example, compared to an indoor environment, e.g., a building.

In another example, the yaw angular rotation threshold may be used, for example, to determine an angular deviation from a center of a circular hallway, for example, if a map, e.g., of a floor plan, of an indoor environment, e.g., a building, is available and the map indicates that the user is walking down a circular hallway.

In some demonstrative embodiments, orientation estimator 132 may improve orientation accuracy by enabling location estimator 140 to correct the gyroscope related errors, e.g., to prevent the gyroscope related errors from affecting the estimated location of device 102. Accordingly, orientation estimator 132 may improve an accuracy of the estimated location of device 102, e.g., when device 102 is located at an indoor location.

In some demonstrative embodiments, orientation estimator 132 may enable avoiding accumulation of the gyroscope errors, for example, by resetting the yaw value, the roll value and/or the pitch value at a step, e.g., as a result from an unintentional yaw change and/or an unintentional tilt change.

In some demonstrative embodiments, orientation estimator 132 may perform an online calibration of angular errors, for example, by calculating the yaw moving average, the pitch moving average and/or the roll moving average. For example, the relatively small angular rotations within each step may be caused by the gyroscope drift bias, by the measurement noise, by an unintentional random motion. Accordingly, the online calibration may enable removing an impact of the relatively small angular rotations. For example, relatively small angular rotations caused by random motions are likely to be cancelled out. As a result, orientation estimator 132 may perform an online calibration of the gyroscope bias drift, for example, to track orientation changes for a significant period of time, e.g., greater than ten minutes.

In some demonstrative embodiments, orientation estimator 132 may perform a Self-contained error correction of the gyroscope related errors. For example, orientation estimator 132 may not depend on any other sensor or any other external reference to perform the correction. This is in contrast to other methods of correcting the gyroscope related errors, for example, using Kalman a filter to track the tilt bias changes, which may rely on an external reference signal, e.g., such as gravity, which may require the user to be in a stationary position, for example, to enable separation of gravity from the vertical linear acceleration.

Figure 3:
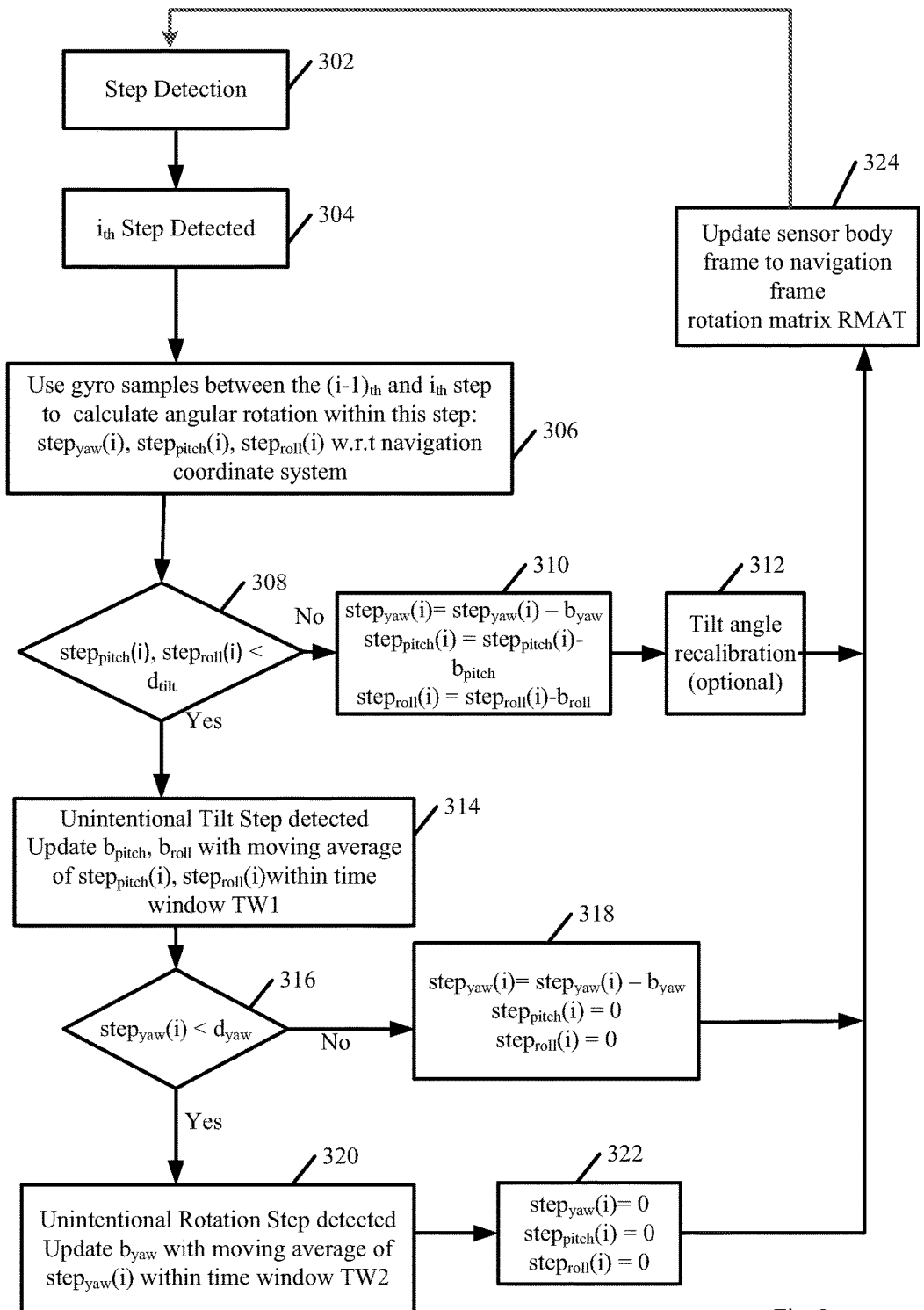
FIG. 3 is a schematic flow chart illustration of a method of correcting orientation errors, in accordance with some demonstrative embodiments.

Reference is made to FIG. 3, which schematically illustrates a flow chart of a method of correcting orientation errors of a mobile device, in accordance with some demonstrative embodiments. In some embodiments, one or more of the operations of the method of FIG. 3 may be performed by a system, e.g., system 100 (FIG. 1), a mobile device, e.g., device 102 (FIG. 1), and/or an orientation estimator, e.g., orientation estimator 132 (FIG. 1).

As indicated at block 302, the method may include detecting steps of the user carrying the mobile device. For example, pedometer 124 (FIG. 1) may detect the steps of the user, e.g., as described above.

As indicated at block 304, the method may include detecting a current step ("the $i_{th}$ step"). For example, pedometer 124 (FIG. 1) may detect the first step, e.g., as described above.

As indicated at block 306, the method may include using gyroscope samples between the current step and a preceding step ("the $(i-1)_{th}$ step") to calculate angular rotation between the current step and the preceding step. For example, orientation estimator 132 (FIG. 1) may determine the yaw angular rotation based on the yaw parameter measurements provided by gyroscope 125 (FIG. 1), e.g., as described above.

As indicated at block 306, the calculated angular rotation may include a yaw angular rotation, denoted $step_{yaw}(i)$, a pitch angular rotation, denoted $step_{pitch}(i)$, and/or a roll angular rotation, denoted $step_{roll}(i)$ with respect to a sensor body coordinate frame. For example, orientation estimator 132 (FIG. 1) may determine the yaw angular rotation, the pitch angular rotation and/or the roll angular rotation, e.g., as described above.

As indicated at block 308, the method may include determining whether or not the calculated pitch angular rotation and/or the calculated roll angular rotation are less than a predefined tilt threshold, denoted $d_{tilt}$. For example, orientation estimator 132 (FIG. 1) may determine whether or not the roll angular rotation and/or the pitch angular rotation are less than the predefined tilt angular rotation threshold, e.g., as described above.

As indicated at block 310, the method may include updating the yaw angular rotation based on a difference between the calculated yaw angular rotation and a yaw bias, denoted $b_{yaw}$; updating the pitch angular rotation based on a difference between the calculated pitch angular rotation and a pitch bias, denoted $b_{pitch}$; and updating the roll angular rotation based on a difference between the calculated roll angular rotation and a roll bias, denoted $b_{roll}$, for example, if the calculated pitch angular rotation and/or the calculated roll angular rotation are equal to or greater than the predefined tilt threshold $d_{tilt}$. For example, orientation estimator 132 (FIG. 1) may update the yaw value, the pitch value and the roll value, for example, if the roll angular rotation and/or the pitch angular rotation are equal to or greater than the predefined tilt threshold, e.g., as a result of an intentional tilt of device 102 (FIG. 1).

As indicated at block 312, the method may include optionally performing a tilt angle recalibration. For example, orientation estimator 132 (FIG. 1) may recalibrate a tilt angle of device 102 (FIG. 1), e.g., as a result of the intentional tilt of device 102 (FIG. 1).

As indicated at block 314, the method may include detecting an unintentional tilt of the mobile device, for example, if the calculated pitch angular rotation and the calculated roll angular rotation is less than the predefined tilt threshold $d_{tilt}$. For example, orientation estimator 132 (FIG. 1) may detect an unintentional tilt of device 102 (FIG. 1), for example, if the roll angular rotation and the pitch angular rotation are less than the predefined tilt threshold, e.g., as described above.

As indicated at block 314, detecting the unintentional tilt of the mobile device may include updating the pitch bias $b_{pitch}$, and updating the roll bias $b_{roll}$. For example, orientation estimator 132 (FIG. 1) may update the pitch bias based and the roll bias.

As indicated at block 314, updating the pitch bias $b_{pitch}$ may include updating a pitch moving average within a tilt time window, denoted TW1, with the calculated pitch angular rotation. For example, orientation estimator 132 (FIG. 1) may update the pitch moving average within the tilt time window, e.g., as described above.

As indicated at block 314, updating the roll bias $b_{roll}$ may include updating a roll moving average within the tilt time window TW1 with the calculated roll angular rotation. For example, orientation estimator 132 (FIG. 1) may update the roll moving average within the tilt time window, e.g., as described above.

As indicated at block 316, the method may include determining whether or not the calculated yaw angular rotation is less than a predefined yaw angular rotation threshold, denoted $d_{yaw}$. For example, orientation estimator 132 (FIG. 1) may determine whether or not the yaw angular rotation is less than the predefined yaw angular rotation threshold, e.g., as described above.

As indicated at block 318, the method may include updating the yaw angular rotation based on a difference between the calculated yaw angular rotation and the yaw bias $b_{yaw}$, resetting the pitch angular rotation and resetting the roll angular rotation, for example, if the yaw angular rotation is equal to or greater than the predefined yaw angular rotation threshold, e.g., indicating an intentional yaw change. For example, orientation estimator 132 (FIG. 1) may update the yaw value based on the yaw bias and the yaw angular rotation, and may reset the pitch value and the roll value, for example, if the yaw angular rotation is equal to or greater than the predefined yaw angular rotation threshold, e.g., as described above.

As indicated at block 320, the method may include detecting an unintentional yaw change of the mobile device, for example, if the calculated yaw angular rotation is less than the predefined yaw angular rotation threshold. For example, orientation estimator 132 (FIG. 1) may detect an unintentional yaw change of device 102 (FIG. 1), for example, if the yaw angular rotation is less than the predefined yaw angular rotation threshold, e.g., as described above.

As indicated at block 320, detecting the unintentional yaw may include updating the yaw bias $b_{yaw}$. For example, orientation estimator 132 may update the yaw bias.

As indicated at block 320, updating the yaw bias $b_{yaw}$ may include updating the yaw moving average with the calculated yaw angular rotation, within a yaw time window, denoted TW2. For example, orientation estimator 132 may update the yaw moving average based on the yaw angular rotation within the yaw time window.

As indicated at block 322, the method may include resetting the yaw angular rotation, resetting the pitch angular rotation and resetting the roll angular rotation, for example, if the yaw angular rotation is less than the predefined yaw angular rotation threshold, e.g., indicating an unintentional yaw change. For example, orientation estimator 132 (FIG. 1) may reset the yaw value, reset the pitch value and the roll value, for example, if the yaw angular rotation is less than the predefined yaw angular rotation threshold, e.g., as described above.

As indicated at block 324, the method may include updating a sensor body frame to navigation frame rotation matrix (RMAT), for example, upon an update of at least one orientation parameter of the pitch angular rotation, the roll angular rotation, and/or the yaw angular rotation, e.g., as described above with reference to blocks 312, 318 and/or 322. For example, location estimator 132 (FIG. 1) may update the navigation frame rotation matrix, for example, upon updating the yaw value, the roll value and/or the pitch value, e.g., as describes above.

Figure 4:
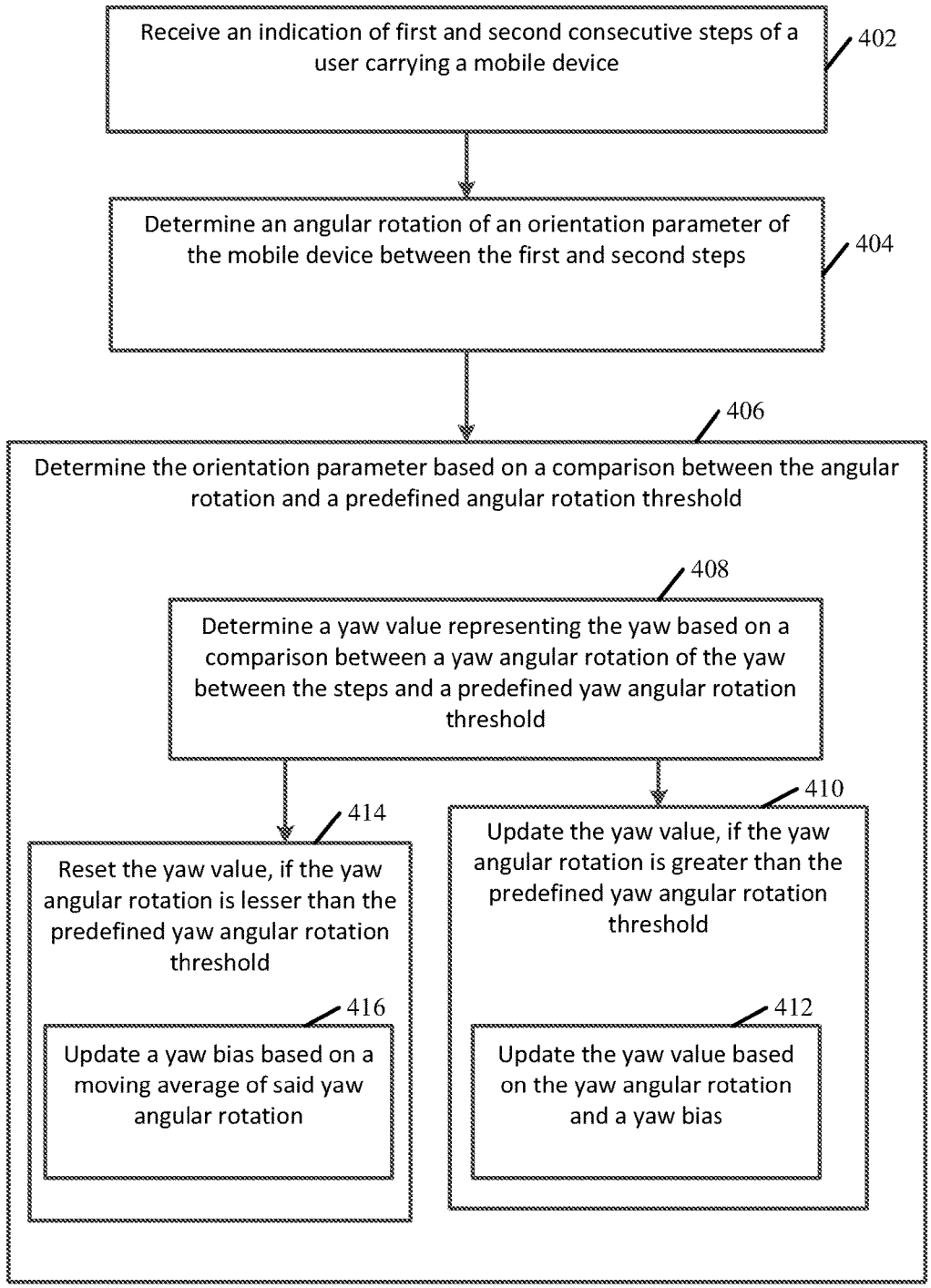
FIG. 4 is a schematic flow chart illustration of a method of estimating an orientation a mobile device, in accordance with some demonstrative embodiments.

Reference is made to FIG. 4, which schematically illustrates a flow chart of a method of estimating an orientation of a mobile device carried by a user of the mobile device, in accordance with some demonstrative embodiments. In some embodiments, one or more of the operations of the method of FIG. 4 may be performed by a system, e.g., system 100 (FIG. 1), a mobile device, e.g., device 102 (FIG. 1), and/or an orientation estimator, e.g., orientation estimator 132 (FIG. 1).

As indicated at block 402, the method may include receiving an indication of first and second consecutive steps of a user carrying a mobile device. For example, orientation estimator 132 (FIG. 1) may receive indication 129 (FIG. 1), e.g., as described above.

As indicated at block 404, the method may include determining an angular rotation of an orientation parameter of the mobile device between the first and second steps. For example, orientation estimator 132 (FIG. 1) may determine the angular rotation of the orientation parameter of mobile device 102 (FIG. 1) between the first and second steps, e.g., as described above.

As indicated at block 406, the method may include determining the orientation parameter based on a comparison between the angular rotation and a predefined angular rotation threshold. For example, orientation estimator 132 (FIG. 1) may determine the orientation parameter based on a comparison between the angular rotation and the predefined angular rotation threshold, e.g., as described above.

As indicated at block 408, determining the orientation parameter may include determining a yaw value representing the yaw based on a comparison between a yaw angular rotation of the yaw between the first and second steps and a predefined yaw angular rotation threshold. For example, orientation estimator 132 (FIG. 1) may determine the yaw value based on a comparison between the yaw angular rotation between the first and second steps and the predefined yaw angular rotation threshold, e.g., as described above.

As indicated at block 410, the method may include updating the yaw value, if the yaw angular rotation is greater than the predefined yaw angular rotation threshold. For example, orientation estimator 132 (FIG. 1) may update the yaw value, if the yaw angular rotation is greater than the predefined yaw angular rotation threshold, e.g., as described above.

As indicated at block 412, updating the yaw value may include updating the yaw value based on the yaw angular rotation and a yaw bias. For example, orientation estimator 132 (FIG. 1) may update the yaw value based on the yaw angular rotation and a yaw bias, e.g., as described above.

As indicated at block 414, the method may include resetting the yaw value, if the yaw angular rotation is less than the predefined yaw angular rotation threshold. For example, orientation estimator 132 (FIG. 1) may reset the yaw value, if the yaw angular rotation is less than the predefined yaw angular rotation threshold, e.g., as described above.

As indicated at block 416, resetting the yaw value may include updating a yaw bias based on a moving average of the yaw angular rotation, e.g. if the yaw angular rotation is less than the predefined yaw angular rotation threshold. For example, orientation estimator 132 (FIG. 1) may update the yaw bias based on the yaw moving average, for example, if the yaw angular rotation is less than the predefined yaw angular rotation threshold, e.g., as described above.

Figure 5:
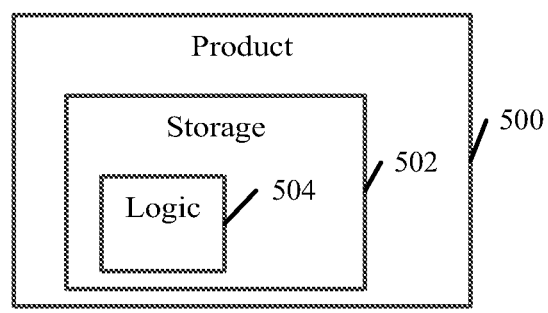
FIG. 5 is a schematic illustration of a product of manufacture, in accordance with some demonstrative embodiments.
Figure 6:
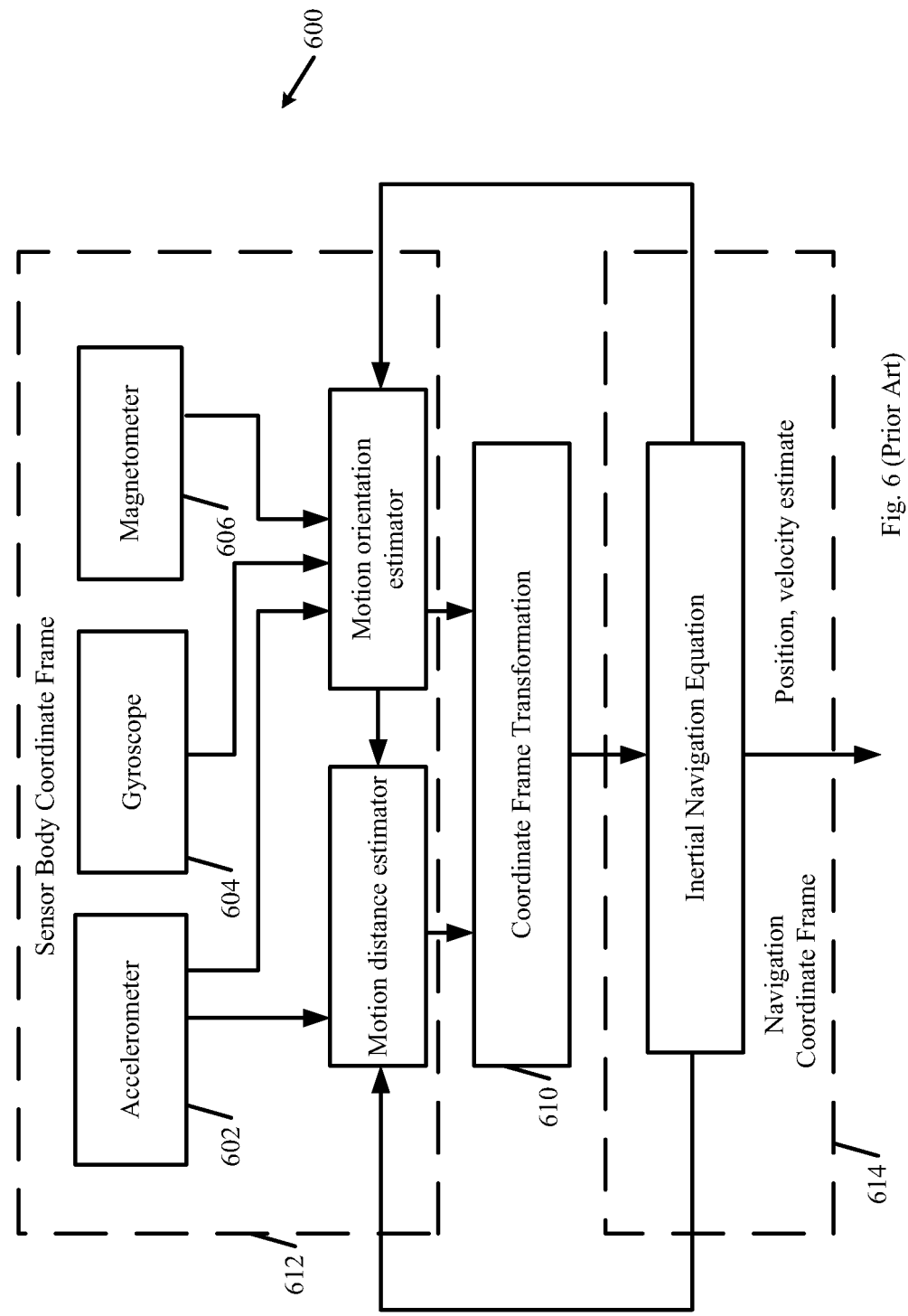
FIG. 6 is a schematic functional illustration of an inertial navigation system.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of mobile device 102 (FIG. 1), orientation estimator 132 (FIG. 1), and/or to perform one or more operations of the methods of FIGS. 3 and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising an integrated circuit, an input to the integrated circuit, and an output from the integrated circuit, the integrated circuit comprising an orientation estimator to receive an indication of first and second consecutive steps of a user carrying a mobile device, to determine an angular rotation of the orientation parameter between the first and second steps, and to determine a value of the orientation parameter based on a comparison between the angular rotation and at least one angular rotation threshold.

Example 2 includes the subject matter Example 1, and optionally, wherein the at least one orientation parameter comprises at least one orientation parameter selected from the group consisting of a yaw of the mobile device, a pitch of the mobile device and a roll of the mobile device.

Example 3 includes the subject matter Example 2, and optionally, wherein the orientation estimator is to determine a yaw value representing the yaw based on a comparison between a yaw angular rotation of the yaw between the steps and a yaw angular rotation threshold.

Example 4 includes the subject matter Example 3, and optionally, wherein the orientation estimator is to update the yaw value, if the yaw angular rotation is greater than the yaw angular rotation threshold.

Example 5 includes the subject matter Example 4, and optionally, wherein the orientation estimator is to update the yaw value based on the yaw angular rotation and a yaw bias.

Example 6 includes the subject matter Example 5, and optionally, wherein the orientation estimator is to update the yaw bias based on the yaw angular rotation, if the yaw angular rotation is less than the yaw angular rotation threshold.

Example 7 includes the subject matter Example 5 or 6, and optionally, wherein the orientation estimator is to update the yaw bias according a yaw moving average, within a time window, of one or more yaw angular rotation values, which are less than the yaw angular rotation threshold.

Example 8 includes the subject matter any one of Examples 3-7, and optionally, wherein the orientation estimator is to reset the yaw value, if the yaw angular rotation is less than the yaw angular rotation threshold.

Example 9 includes the subject matter any one of Examples 3-8, and optionally, wherein the orientation estimator is to reset a pitch value representing the pitch and a roll value representing the roll, if a pitch angular rotation of the pitch between the steps is less than a pitch angular rotation threshold, and a roll angular rotation of the roll between the steps is less than a roll angular rotation threshold.

Example 10 includes the subject matter Example 9, and optionally, wherein the orientation estimator is to update the pitch value, if the pitch angular rotation is greater than the pitch angular rotation threshold; and to update the roll value, if the roll angular rotation is greater than the roll angular rotation threshold.

Example 11 includes the subject matter Example 10, and optionally, wherein the orientation estimator is to update the pitch value based on the pitch angular rotation and a pitch bias, and to update the roll value based on the roll angular rotation and a roll bias.

Example 12 includes the subject matter Example 11, and optionally, wherein the orientation estimator is to update the pitch bias according to a pitch moving average of one or more pitch angular rotation values, which are less than the pitch angular rotation threshold, and to update the roll bias according to a roll moving average of roll angular rotation values, which are less than the roll angular rotation threshold.

Example 13 includes the subject matter any one of Examples 1-12, and optionally, wherein the orientation estimator is to determine the angular rotation based on an integral of a sequence of measured values of the orientation parameter between the first step and the second step.

Example 14 includes the subject matter any one of Examples 1-13, and optionally, wherein the orientation estimator is to correct one or more orientation errors of a gyroscope of the mobile device based on the value of the orientation parameter.

Example 15 includes the subject matter any one of Examples 1-14, and optionally, wherein the orientation estimator is to operate in an indoor environment.

Example 16 includes a mobile device comprising a processor; a memory; a pedometer to detect steps of a user carrying the mobile device; an orientation sensor to measure at least one orientation parameter of the mobile device; and an orientation estimator to receive an indication from the pedometer of first and second consecutive steps, to determine an angular rotation of the orientation parameter between the steps, and to adjust a value of the orientation parameter based on a comparison between the angular rotation and a predefined angular rotation threshold.

Example 17 includes the subject matter Example 16, and optionally, wherein the at least one orientation parameter comprises at least one orientation parameter selected from the group consisting of a yaw of the mobile device, a pitch of the mobile device and a roll of the mobile device.

Example 18 includes the subject matter Example 17, and optionally, wherein the orientation estimator is to determine a yaw value representing the yaw based on a comparison between a yaw angular rotation of the yaw between the steps and a yaw angular rotation threshold.

Example 19 includes the subject matter Example 18, and optionally, wherein the orientation estimator is to update the yaw value, if the yaw angular rotation is greater than the yaw angular rotation threshold.

Example 20 includes the subject matter Example 19, and optionally, wherein the orientation estimator is to update the yaw value based on the yaw angular rotation and a yaw bias.

Example 21 includes the subject matter Example 20, and optionally, wherein the orientation estimator is to update the yaw bias based on the yaw angular rotation, if the yaw angular rotation is less than the yaw angular rotation threshold.

Example 22 includes the subject matter Example 20 or 21, and optionally, wherein the orientation estimator is to update the yaw bias according a yaw moving average, within a time window, of one or more yaw angular rotation values, which are less than the yaw angular rotation threshold.

Example 23 includes the subject matter any one of Examples 18-22, and optionally, wherein the orientation estimator is to reset the yaw value, if the yaw angular rotation is less than the yaw angular rotation threshold.

Example 24 includes the subject matter any one of Examples 18-23, and optionally, wherein the orientation estimator is to reset a pitch value representing the pitch and a roll value representing the roll, if a pitch angular rotation of the pitch between the steps is less than a pitch angular rotation threshold, and a roll angular rotation of the roll between the steps is less than a roll angular rotation threshold.

Example 25 includes the subject matter Example 24, and optionally, wherein the orientation estimator is to update the pitch value, if the pitch angular rotation is greater than the pitch angular rotation threshold; and to update the roll value, if the roll angular rotation is greater than the roll angular rotation threshold.

Example 26 includes the subject matter Example 25, and optionally, wherein the orientation estimator is to update the pitch value based on the pitch angular rotation and a pitch bias, and to update the roll value based on the roll angular rotation and a roll bias.

Example 27 includes the subject matter Example 26, and optionally, wherein the orientation estimator is to update the pitch bias according to a pitch moving average of one or more pitch angular rotation values, which are less than the pitch angular rotation threshold, and to update the roll bias according to a roll moving average of roll angular rotation values, which are less than the roll angular rotation threshold.

Example 28 includes the subject matter any one of Examples 16-27, and optionally, wherein the orientation estimator is to determine the angular rotation based on an integral of a sequence of measured values of the orientation parameter between the first step and the second step.

Example 29 includes the subject matter any one of Examples 16-28, and optionally, wherein the orientation estimator is to correct one or more orientation errors of a gyroscope of the mobile device based on the value of the orientation parameter.

Example 30 includes the subject matter any one of Examples 16-29, and optionally, wherein the orientation estimator is to operate in an indoor environment.

Example 31 includes a method comprising receiving an indication of first and second consecutive steps of a user carrying a mobile device; determining an angular rotation of an orientation parameter of the mobile device between the first and second steps; and determining a value of the orientation parameter based on a comparison between the angular rotation and a predefined angular rotation threshold.

Example 32 includes the subject matter Example 31, and optionally, wherein the at least one orientation parameter comprises at least one orientation parameter selected from the group consisting of a yaw of the mobile device, a pitch of the mobile device and a roll of the mobile device.

Example 33 includes the subject matter Example 32, and optionally, comprising determining a yaw value representing the yaw based on a comparison between a yaw angular rotation of the yaw between the steps and a predefined yaw angular rotation threshold.

Example 34 includes the subject matter Example 33, and optionally, comprising updating the yaw value, if the yaw angular rotation is greater than the predefined yaw angular rotation threshold.

Example 35 includes the subject matter Example 34, and optionally, comprising updating the yaw value based on the yaw angular rotation and a yaw bias.

Example 36 includes the subject matter Example 35, and optionally, comprising updating the yaw bias based on the yaw angular rotation, if the yaw angular rotation is less than the predefined yaw angular rotation threshold.

Example 37 includes the subject matter Example 35 or 36, and optionally, comprising updating the yaw bias according a yaw moving average, within a time window, of one or more yaw angular rotation values, which are less than the yaw angular rotation threshold.

Example 38 includes the subject matter any one of Examples 33-37, and optionally, comprising resetting the yaw value, if the yaw angular rotation is less than the predefined yaw angular rotation threshold.

Example 39 includes the subject matter any one of Examples 33-38, and optionally, comprising resetting a pitch value representing the pitch and a roll value representing the roll, if a pitch angular rotation of the pitch between the steps is less than a predefined pitch rotation threshold, and a roll angular rotation of the roll between the steps is less than a predefined roll rotation threshold.

Example 40 includes the subject matter Example 39, and optionally, comprising updating the pitch value, if the pitch angular rotation is greater than the pitch angular rotation threshold; and updating the roll value, if the roll angular rotation is greater than the roll angular rotation threshold.

Example 41 includes the subject matter Example 40, and optionally, comprising updating the pitch value based on the pitch angular rotation and a pitch bias, and updating the roll value based on the roll angular rotation and a roll bias.

Example 42 includes the subject matter Example 41, and optionally, comprising updating the pitch bias according to a pitch moving average of one or more pitch angular rotation values, which are less than the pitch angular rotation threshold, and updating the roll bias according to a roll moving average of roll angular rotation values, which are less than the roll angular rotation threshold.

Example 43 includes the subject matter any one of Examples 31-42, and optionally, comprising determining the angular rotation based on an integral of a sequence of measured values of the orientation parameter between the first step and the second step.

Example 44 includes the subject matter any one of Examples 31-43, and optionally, comprising correcting one or more orientation errors of a gyroscope of the mobile device based on the value of the orientation parameter.

Example 45 includes the subject matter any one of Examples 31-44, and optionally, comprising determining the value of the orientation parameter in an indoor environment.

Example 46 includes a product including a non-transitory storage medium having stored thereon instructions that, when executed by a machine, result in receiving an indication of first and second consecutive steps of a user carrying a mobile device; determining an angular rotation of an orientation parameter of the mobile device between the first and second steps; and determining a value of the orientation parameter based on a comparison between the angular rotation and a predefined angular rotation threshold.

Example 47 includes the subject matter Example 46, and optionally, wherein the at least one orientation parameter comprises at least one orientation parameter selected from the group consisting of a yaw of the mobile device, a pitch of the mobile device and a roll of the mobile device.

Example 48 includes the subject matter Example 47, and optionally, wherein the instructions result in determining a yaw value representing the yaw based on a comparison between a yaw angular rotation of the yaw between the steps and a predefined yaw angular rotation threshold.

Example 49 includes the subject matter Example 48, and optionally, wherein the instructions result in updating the yaw value, if the yaw angular rotation is greater than the predefined yaw angular rotation threshold.

Example 50 includes the subject matter Example 49, and optionally, wherein the instructions result in updating the yaw value based on the yaw angular rotation and a yaw bias.

Example 51 includes the subject matter Example 50, and optionally, wherein the instructions result in updating the yaw bias based on the yaw angular rotation, if the yaw angular rotation is less than the predefined yaw angular rotation threshold.

Example 52 includes the subject matter Example 50 or 51, and optionally, wherein the instructions result in updating the yaw bias according a yaw moving average, within a time window, of one or more yaw angular rotation values, which are less than the yaw angular rotation threshold.

Example 53 includes the subject matter any one of Examples 48-52, and optionally, wherein the instructions result in resetting the yaw value, if the yaw angular rotation is less than the predefined yaw angular rotation threshold.

Example 54 includes the subject matter any one of Examples 48-53, and optionally, wherein the instructions result in resetting a pitch value representing the pitch and a roll value representing the roll, if a pitch angular rotation of the pitch between the steps is less than a predefined pitch rotation threshold, and a roll angular rotation of the roll between the steps is less than a predefined roll rotation threshold.

Example 55 includes the subject matter Example 54, and optionally, wherein the instructions result in updating the pitch value, if the pitch angular rotation is greater than the pitch angular rotation threshold; and updating the roll value, if the roll angular rotation is greater than the roll angular rotation threshold.

Example 56 includes the subject matter Example 55, and optionally, wherein the instructions result in updating the pitch value based on the pitch angular rotation and a pitch bias, and updating the roll value based on the roll angular rotation and a roll bias.

Example 57 includes the subject matter Example 56, and optionally, wherein the instructions result in updating the pitch bias according to a pitch moving average of one or more pitch angular rotation values, which are less than the pitch angular rotation threshold, and updating the roll bias according to a roll moving average of roll angular rotation values, which are less than the roll angular rotation threshold.

Example 58 includes the subject matter any one of Examples 46-57, and optionally, wherein the instructions result in determining the angular rotation based on an integral of a sequence of measured values of the orientation parameter between the first step and the second step.

Example 59 includes the subject matter any one of Examples 46-58, and optionally, wherein the instructions result in correcting one or more orientation errors of a gyroscope of the mobile device based on the value of the orientation parameter.

Example 60 includes the subject matter any one of Examples 46-59, and optionally, wherein the instructions result in determining the value of the orientation parameter in an indoor environment.

Example 61 includes an apparatus comprising means for receiving an indication of first and second consecutive steps of a user carrying a mobile device; means for determining an angular rotation of an orientation parameter of the mobile device between the first and second steps; and means for determining a value of the orientation parameter based on a comparison between the angular rotation and a predefined angular rotation threshold.

Example 62 includes the subject matter Example 61, and optionally, wherein the at least one orientation parameter comprises at least one orientation parameter selected from the group consisting of a yaw of the mobile device, a pitch of the mobile device and a roll of the mobile device.

Example 63 includes the subject matter Example 62, and optionally, comprising means for determining a yaw value representing the yaw based on a comparison between a yaw angular rotation of the yaw between the steps and a predefined yaw angular rotation threshold.

Example 64 includes the subject matter Example 63, and optionally, comprising means for updating the yaw value, if the yaw angular rotation is greater than the predefined yaw angular rotation threshold.

Example 65 includes the subject matter Example 64, and optionally, comprising means for updating the yaw value based on the yaw angular rotation and a yaw bias.

Example 66 includes the subject matter Example 65, and optionally, comprising means for updating the yaw bias based on the yaw angular rotation, if the yaw angular rotation is less than the predefined yaw angular rotation threshold.

Example 67 includes the subject matter Example 65 or 66, and optionally, comprising means for updating the yaw bias according a yaw moving average, within a time window, of one or more yaw angular rotation values, which are less than the yaw angular rotation threshold.

Example 68 includes the subject matter any one of Examples 63-67, and optionally, comprising means for resetting the yaw value, if the yaw angular rotation is less than the predefined yaw angular rotation threshold.

Example 69 includes the subject matter any one of Examples 63-68, and optionally, comprising means for resetting a pitch value representing the pitch and a roll value representing the roll, if a pitch angular rotation of the pitch between the steps is less than a predefined pitch rotation threshold, and a roll angular rotation of the roll between the steps is less than a predefined roll rotation threshold.

Example 70 includes the subject matter Example 69, and optionally, comprising means for updating the pitch value, if the pitch angular rotation is greater than the pitch angular rotation threshold; and updating the roll value, if the roll angular rotation is greater than the roll angular rotation threshold.

Example 71 includes the subject matter Example 70, and optionally, comprising means for updating the pitch value based on the pitch angular rotation and a pitch bias, and updating the roll value based on the roll angular rotation and a roll bias.

Example 72 includes the subject matter Example 71, and optionally, comprising means for updating the pitch bias according to a pitch moving average of one or more pitch angular rotation values, which are less than the pitch angular rotation threshold, and updating the roll bias according to a roll moving average of roll angular rotation values, which are less than the roll angular rotation threshold.

Example 73 includes the subject matter any one of Examples 61-72, and optionally, comprising means for determining the angular rotation based on an integral of a sequence of measured values of the orientation parameter between the first step and the second step.

Example 74 includes the subject matter any one of Examples 61-73, and optionally, comprising means for correcting one or more orientation errors of a gyroscope of the mobile device based on the value of the orientation parameter.

Example 75 includes the subject matter any one of Examples 61-74, and optionally, comprising means for determining the value of the orientation parameter of the mobile device in an indoor environment.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   an integrated circuit;
   an input to the integrated circuit; and
   an output from the integrated circuit,
   the integrated circuit including an orientation estimator configured to estimate an orientation of a mobile device based on input from one or more orientation sensors of the mobile device, the one or more orientation sensors comprising a gyroscope of the mobile device, the orientation estimator configured to receive an indication from a pedometer of first and second consecutive steps of a user carrying the mobile device, and to correct one or more orientation errors of the gyroscope based at least on the indication from the pedometer of the first and second consecutive steps by determining a yaw angular rotation of said mobile device between said first and second steps, a pitch angular rotation of said mobile device between said first and second steps, and a roll angular rotation of said mobile device between said first and second steps, said orientation estimator configured to, based on said yaw angular rotation, said pitch angular rotation and said roll angular rotation, determine a yaw value representing a yaw of said mobile device, a pitch value representing a pitch of said mobile device and a roll value representing a roll of said mobile device, said orientation estimator is configured to correct the one or more orientation errors of the gyroscope of said mobile device based on the yaw value, the pitch value and the roll value by:
  comparing said pitch angular rotation to a pitch angular rotation threshold, comparing said roll angular rotation to a roll angular rotation threshold, and comparing said yaw angular rotation to a yaw angular rotation threshold; and
  updating the yaw value and resetting the pitch value and the roll value, when said pitch angular rotation is determined to be less than said pitch angular rotation threshold, said roll angular rotation is determined to be less than said roll angular rotation threshold, and said yaw angular rotation is determined to be greater than said yaw angular rotation threshold.

2. The apparatus of claim 1, wherein said orientation estimator is configured to update said yaw value based on said yaw angular rotation and a yaw bias.

3. The apparatus of claim 2, wherein said orientation estimator is to update said yaw bias based on said yaw angular rotation, if said yaw angular rotation is less than said yaw angular rotation threshold.

4. The apparatus of claim 2, wherein said orientation estimator is to update said yaw bias according a yaw moving average, within a time window, of one or more yaw angular rotation values, which are less than the yaw angular rotation threshold.

5. The apparatus of claim 1, wherein said orientation estimator is configured to reset said yaw value, if the yaw angular rotation is determined to be less than the yaw angular rotation threshold.

6. The apparatus of claim 1, wherein said orientation estimator is configured to update said pitch value, if said pitch angular rotation is determined to be greater than said pitch angular rotation threshold, and to update said roll value, if said roll angular rotation is determined to be greater than said roll angular rotation threshold.

7. The apparatus of claim 1, wherein said orientation estimator is configured to update said pitch value based on said pitch angular rotation and a pitch bias, and to update said roll value based on said roll angular rotation and a roll bias.

8. The apparatus of claim 7, wherein said orientation estimator is to update said pitch bias according to a pitch moving average of one or more pitch angular rotation values, which are less than the pitch angular rotation threshold, and to update said roll bias according to a roll moving average of roll angular rotation values, which are less than the roll angular rotation threshold.

9. The apparatus of claim 1, wherein said orientation estimator is configured to determine said yaw angular rotation based on an integral of a sequence of measured values of said yaw of said mobile device between the first step and the second step.

10. The apparatus of claim 1, wherein said orientation estimator is configured to determine a classification of said yaw angular rotation as an intentional yaw angular rotation or an unintentional yaw angular rotation based on the comparison between the yaw angular rotation and the yaw angular rotation threshold, and to determine the yaw value based on the classification of the yaw angular rotation.

11. The apparatus of claim 1, wherein said orientation estimator is configured to correct said one or more orientation errors of said gyroscope in an indoor environment.

12. A mobile device comprising:
  a memory;
  a pedometer configured to detect steps of a user carrying said mobile device;
  at least one orientation sensor configured to measure a yaw of said mobile device, a pitch of said mobile device, and a roll of said mobile device, the at least one orientation sensor comprising a gyroscope; and
  an orientation estimator configured to estimate an orientation of the mobile device based on input from the at least one orientation sensor, the orientation estimator configured to receive an indication from said pedometer of first and second consecutive steps, and to correct one or more orientation errors of the gyroscope based at least on the indication from the pedometer of the first and second consecutive steps by determining a yaw angular rotation of said mobile device between said first and second steps, a pitch angular rotation of said mobile device between said first and second steps, and a roll angular rotation of said mobile device between said first and second steps, said orientation estimator configured to, based on said yaw angular rotation, said pitch angular rotation and said roll angular rotation, adjust a yaw value representing said yaw of said mobile device, a pitch value representing said pitch of said mobile device and a roll value representing said roll of said mobile device, said orientation estimator is configured to correct the one or more orientation errors of said gyroscope based on the yaw value, the pitch value and the roll value by:
    comparing said pitch angular rotation to a pitch angular rotation threshold, comparing said roll angular rotation to a roll angular rotation threshold, and comparing said yaw angular rotation to a yaw angular rotation threshold; and
    updating the yaw value and resetting the pitch value and the roll value, when said pitch angular rotation is determined to be less than said pitch angular rotation threshold, said roll angular rotation is determined to be less than said roll angular rotation threshold, and said yaw angular rotation is determined to be greater than said yaw angular rotation threshold.

13. The mobile device of claim 12, wherein said orientation estimator is configured to determine a classification of said yaw angular rotation as an intentional yaw angular rotation or an unintentional yaw angular rotation based on the comparison between the yaw angular rotation and the yaw angular rotation threshold, and to determine the yaw value based on the classification of the yaw angular rotation.

14. The mobile device of claim 12, wherein said orientation estimator is configured to reset said yaw value, if the yaw angular rotation is less than the yaw angular rotation threshold.

15. A method comprising:
  estimating an orientation of a mobile device based on input from one or more orientation sensors of the mobile device, the one or more orientation sensors comprising a gyroscope of the mobile device;
  receiving an indication from a pedometer of first and second consecutive steps of a user carrying the mobile device; and
  correcting one or more orientation errors of the gyroscope based at least on the indication from the pedometer of the first and second consecutive steps by:
    determining a yaw angular rotation of said mobile device between said first and second steps, a pitch angular rotation of said mobile device between said first and second steps, and a roll angular rotation of said mobile device between said first and second steps;

based on said yaw angular rotation, said pitch angular rotation and said roll angular rotation, determining a yaw value representing a yaw of said mobile device, a pitch value representing a pitch of said mobile device, and a roll value representing a roll of said mobile device, determining said yaw value, said pitch value, and said roll value comprises comparing said pitch angular rotation to a pitch angular rotation threshold, said roll angular rotation to a roll angular rotation threshold, and said yaw angular rotation to a yaw angular rotation threshold, and updating the yaw value and resetting the pitch value and the roll value, when said pitch angular rotation is determined to be less than said pitch angular rotation threshold, said roll angular rotation is determined to be less than said roll angular rotation threshold, and said yaw angular rotation is determined to be greater than said yaw angular rotation threshold; and correcting the one or more orientation errors of the gyroscope of said mobile device based on the yaw value, the pitch value and the roll value.

16. The method of claim 15 comprising resetting said yaw value, if the yaw angular rotation is determined to be less than the yaw angular rotation threshold.

17. The method of claim 15 comprising determining a classification of said yaw angular rotation as an intentional yaw angular rotation or an unintentional yaw angular rotation based on the comparison between the yaw angular rotation and the yaw angular rotation threshold, and determining the yaw value based on the classification of the yaw angular rotation.

18. A product including a non-transitory storage medium having stored thereon instructions that, when executed by a machine, result in:

estimating an orientation of a mobile device based on input from one or more orientation sensors of the mobile device, the one or more orientation sensors comprising a gyroscope of the mobile device;

receiving an indication from a pedometer of first and second consecutive steps of a user carrying the mobile device; and correcting one or more orientation errors of the gyroscope based at least on the indication from the pedometer of the first and second consecutive steps by:

determining a yaw angular rotation of said mobile device between said first and second steps, a pitch angular rotation of said mobile device between said first and second steps, and a roll angular rotation of said mobile device between said first and second steps;

based on said yaw angular rotation, said pitch angular rotation, and said roll angular rotation, determining a yaw value representing a yaw of said mobile device, a pitch value representing a pitch of said mobile device, and a roll value representing a roll of said mobile device, determining said yaw value, said pitch value, and said roll value comprises comparing said pitch angular rotation to a pitch angular rotation threshold, said roll angular rotation to a roll angular rotation threshold, and said yaw angular rotation to a yaw angular rotation threshold, and updating the yaw value and resetting the pitch value and the roll value, when said pitch angular rotation is determined to be less than said pitch angular rotation threshold, said roll angular rotation is determined to be less than said roll angular rotation threshold, and said yaw angular rotation is determined to be greater than said yaw angular rotation threshold; and correcting the one or more orientation errors of the gyroscope of said mobile device based on the yaw value, the pitch value and the roll value.

19. The product of claim 18, wherein said instructions, when executed, result in updating said yaw value based on said yaw angular rotation and a yaw bias.

20. The product of claim 18, wherein said instructions, when executed, result in resetting said yaw value, if the yaw angular rotation is determined to be less than the yaw angular rotation threshold.

21. The product of claim 18, wherein said instructions, when executed, result in determining a classification of said yaw angular rotation as an intentional yaw angular rotation or an unintentional yaw angular rotation based on the comparison between the yaw angular rotation and the yaw angular rotation threshold, and determining the yaw value based on the classification of the yaw angular rotation.

* * * * *